US012282940B2

(12) United States Patent
Feng et al.

(10) Patent No.: US 12,282,940 B2
(45) Date of Patent: Apr. 22, 2025

(54) ADVERTISEMENT TITLE REWRITING METHOD, APPARATUS AND DEVICE, AND STORAGE MEDIUM

(71) Applicant: BEIJING YOUZHUJU NETWORK TECHNOLOGY CO., LTD., Beijing (CN)

(72) Inventors: Jiangtao Feng, Beijing (CN); Han Li, Beijing (CN); Jiaze Chen, Beijing (CN); Yunbo Chen, Beijing (CN); Hao Zhou, Beijing (CN); Lei Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/260,180

(22) PCT Filed: Dec. 29, 2021

(86) PCT No.: PCT/CN2021/142340
§ 371 (c)(1),
(2) Date: Jun. 30, 2023

(87) PCT Pub. No.: WO2022/143732
PCT Pub. Date: Jul. 7, 2022

(65) Prior Publication Data
US 2024/0062253 A1 Feb. 22, 2024

(30) Foreign Application Priority Data
Dec. 31, 2020 (CN) .......................... 202011627693.9

(51) Int. Cl.
*G06Q 30/02* (2023.01)
*G06N 3/0442* (2023.01)
(Continued)

(52) U.S. Cl.
CPC ....... *G06Q 30/0276* (2013.01); *G06N 3/0442* (2023.01); *G06Q 30/0251* (2013.01)

(58) Field of Classification Search
CPC .......... G06Q 30/0276; G06Q 30/0251; G06N 3/0442
See application file for complete search history.

(56) References Cited

U.S. PATENT DOCUMENTS

| 8,078,617 B1 | 12/2011 | Neveitt et al. |
| 2012/0030014 A1* | 2/2012 | Brunsman .......... G06Q 30/0251 705/14.49 |

(Continued)

FOREIGN PATENT DOCUMENTS

| CN | 101311922 A | 11/2008 |
| CN | 101611399 A | 12/2009 |

(Continued)

OTHER PUBLICATIONS

"Title tag optimization using deep learning" (Volpini, Andrea; Published on https://wordlift.io/blog/en/title-tag-seo-using-ai/ in 2018 (screengrab using Wayback Machine on Sep. 24, 2020 using Internet Wayback Machine)) (Year: 2020).*

(Continued)

*Primary Examiner* — James M Detweiler

(57) ABSTRACT

Provided are an advertisement title rewriting method, apparatus and device and a storage medium. The method includes steps described below. Preset information in an advertisement title is replaced with a corresponding placeholder so that the advertisement title is converted into a title template; a rewritten title template is generated through a preset neural network model according to the title template, an advertisement attribute key-value table and a query cluster; and the placeholder in the rewritten title template is replaced with (Continued)

the corresponding preset information so that the rewritten title template is converted into a rewritten title.

18 Claims, 3 Drawing Sheets

(51) Int. Cl.
*G06Q 30/0241* (2023.01)
*G06Q 30/0251* (2023.01)

(56) References Cited

U.S. PATENT DOCUMENTS

| | | | |
|---|---|---|---|
| 2012/0047131 A1* | 2/2012 | Billawala | G06F 16/34 |
| | | | 707/723 |
| 2014/0258002 A1 | 9/2014 | Zimmerman et al. | |
| 2017/0221105 A1 | 8/2017 | Bufe, III et al. | |
| 2018/0107636 A1 | 4/2018 | Huang et al. | |
| 2018/0341998 A1* | 11/2018 | Amarthaluri | G06F 16/2365 |
| 2018/0349330 A1* | 12/2018 | Raghunathan | G06F 40/10 |
| 2021/0390267 A1* | 12/2021 | Wang | G06F 40/56 |
| 2021/0406993 A1* | 12/2021 | Sethi | G06N 3/084 |

FOREIGN PATENT DOCUMENTS

| | | | | |
|---|---|---|---|---|
| CN | 101651550 A | 2/2010 | | |
| CN | 104951190 A | 9/2015 | | |
| CN | 110059309 A | 7/2019 | | |
| CN | 110134931 A | 8/2019 | | |
| CN | 110852801 A | 2/2020 | | |
| CN | 111274799 A | 6/2020 | | |
| CN | 112699656 A | 4/2021 | | |
| CN | 110134931 B | * 9/2023 | ........... G06F 16/958 |

OTHER PUBLICATIONS

First Search Report issued Sep. 24, 2023 in Chinese Application No. 202011627693.9 (3 pages), with English translation (5 pages).
First Office Action issued Sep. 27, 2023 in Chinese Application No. 202011627693.9 (4 pages), with English translation (8 pages).
International Search Report issued Mar. 29, 2022 in International Application No. PCT/CN2021/142340, with English translation (4 pages).

* cited by examiner

ADVERTISEMENT TITLE REWRITING METHOD, APPARATUS AND DEVICE, AND STORAGE MEDIUM

This is a U.S. National Stage Application, filed under 35 U.S.C. 371, of International Patent Application No. PCT/CN2021/142340, filed on Dec. 29, 2021, which claims priority to Chinese Patent Application No. 202011627693.9 filed with the China National Intellectual Property Administration (CNIPA) on Dec. 31, 2020, the disclosures of which are incorporated herein by reference in their entireties.

TECHNICAL FIELD

Embodiments of the present application relate to computer application technologies, for example, an advertisement title rewriting method, apparatus and device and a storage medium.

BACKGROUND

Searching advertising plays an important role in advertising. When a user searches for a query online, an advertisement recommendation system may match the query with multiple advertisements. Then, advertisement titles are rearranged and at least one advertisement title which is most relevant to the query is selected. Finally, the selected advertisement is embedded in a search result for display. The displayed advertisement generally consists of an advertisement title and summary information from the content of the website of the advertisement. The user generally gets elementary understanding of a product from the advertisement title of the product. The user may easily accept the advertisement when viewing the advertisement title highly relevant to the query and may be interested in understanding the product of the advertisement, unless the advertisement query received by the user is highly irrelevant to the searched-for object. Therefore, it is conducive to search engine companies to rewrite a boring title to an attractive title.

Due to a large number of queries and immediate online service requirements, it is not possible to manually achieve the goal of providing titles that match all queries. Unlike text generation and dialogue systems, advertisement title rewriting requires higher consistency between a rewritten title and an original title. For example, it is never allowed to rewrite an advertisement name of a brand to a new name of another brand, which may lead to the risk of false advertising. However, the consistency of rewriting an advertisement title is a very important issue. The consistency issue requires that titles before and after rewriting are consistent in preset information such as the brand and the price.

SUMMARY

Embodiments of the present application provide an advertisement title rewriting method, apparatus and device and a storage medium so that information consistency between a rewritten advertisement title and an original advertisement title is ensured.

In a first aspect, an embodiment of the present application provides an advertisement title rewriting method. The method includes steps described below.

Preset information in an advertisement title is replaced with a corresponding placeholder so that the advertisement title is converted into a title template.

A rewritten title template is generated through a preset neural network model according to the title template, an advertisement attribute key-value table and a query cluster.

The placeholder in the rewritten title template is replaced with the corresponding preset information so that the rewritten title template is converted into a rewritten title.

In a second aspect, an embodiment of the present application further provides an advertisement title rewriting apparatus. The apparatus includes a title template conversion module, a rewritten title template generation module and a rewritten title conversion module.

The title template conversion module is configured to replace preset information in an advertisement title with a corresponding placeholder to convert the advertisement title into a title template.

The rewritten title template generation module is configured to generate, through a preset neural network model, a rewritten title template according to the title template, an advertisement attribute key-value table and a query cluster.

The rewritten title conversion module is configured to replace the placeholder in the rewritten title template with the corresponding preset information to convert the rewritten title template into a rewritten title.

In a third aspect, an embodiment of the present application further provides an advertisement title rewriting device. The advertisement title rewriting device includes at least one processor and a memory configured to store at least one program.

The at least one program, when executed by the at least one processor, causes the at least one processor to implement the advertisement title rewriting method according to any embodiment of the present application.

In a fourth aspect, an embodiment of the present disclosure further provides a storage medium including computer-executable instructions which, when executed by a computer processor, are configured to perform the advertisement title rewriting method according to any embodiment of the present application.

DETAILED DESCRIPTION

Embodiments of the present disclosure are described in more detail hereinafter with reference to the drawings.

It should be understood that various steps recited in the method embodiments of the present disclosure may be performed in a different order and/or in parallel. Additionally, the method embodiments may include additional steps and/or omit the steps shown. The scope of the present disclosure is not limited in this respect.

The term "includes" or its variant used herein means "includes, but is not limited to". The term "based on" means "at least partially based on". The term "an embodiment"

means "at least one embodiment". The term "another embodiment" means "at least one other embodiment". The term "some embodiments" means "at least some embodiments". Related definitions of other terms are given in the description hereinafter.

It is to be noted that references to "first", "second" and the like in the present disclosure are merely intended to distinguish one from another apparatus, module or unit and are not intended to limit the order or interrelationship of the functions performed by the apparatus, module or unit.

It is to be noted that references to modifications of "one" or "multiple" in the present disclosure are intended to be illustrative and not limiting; those skilled in the art should understand that "one" or "multiple" is to be interpreted as "at least one" unless otherwise clearly indicated in the context.

The names of messages or information exchanged between apparatuses in embodiments of the present disclosure are illustrative and not to limit the scope of the messages or information.

Embodiment One

Figure 1:
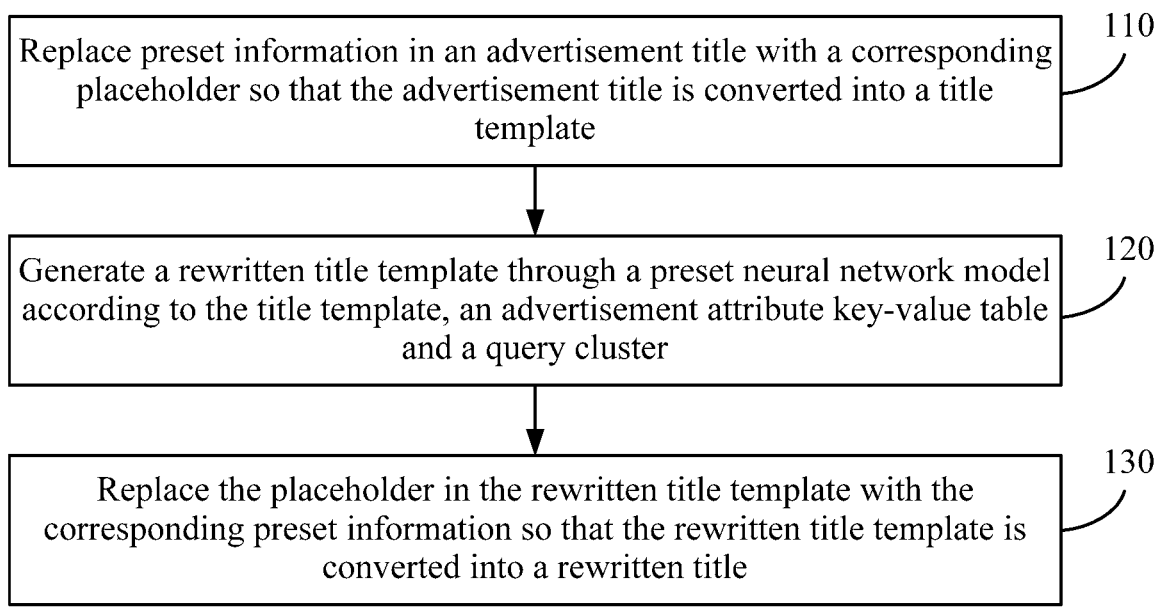
FIG. 1 is a flowchart of an advertisement title rewriting method according to embodiment one of the present application.

FIG. 1 is a flowchart of an advertisement title rewriting method according to embodiment one of the present application. The embodiment is applicable to the case where when a user searches online, an advertisement title relevant to a query of the search is shown to the user, and the advertisement title is rewritten. The method may be executed by an advertisement title rewritten apparatus which may be implemented by hardware and/or software. The method includes steps described below.

In step 110, preset information in an advertisement title is replaced with a corresponding placeholder so that the advertisement title is converted into a title template.

To ensure that a rewritten title generated by a preset neural network model has information consistency with an original advertisement title, the present neural network model uses the title template to replace the original advertising title and uses the placeholder to replace the preset information in the advertisement title. The present information here may be sensitive information in the advertisement title. If the sensitive information after rewriting is inconsistent with the sensitive information before rewriting, false advertising is likely to be generated. The sensitive information here may include a brand, a place, a target audience and a product. The sensitive information may be extracted from the original advertisement title, the corresponding title template is acquired by using the sensitive information, and the title template is then input into the preset neural network model for decoding so that a rewritten title template is obtained.

In step 120, the rewritten title template is generated through the preset neural network model according to the title template, an advertisement attribute key-value table and a query cluster.

For the advertisement title, the advertisement attribute key-value table and the query which are from a search engine, the preset neural network model is set to change the original advertisement title into a rewritten advertisement title which is more attractive. A backbone neural network model of the preset neural network model may be established on a codec architecture. The preset neural network model is composed of a title encoder, a key-value encoder, a query encoder and a decoder. The title encoder is set to convert the title template into a matrix representation and a vector representation, the key-value encoder is set to convert the advertisement attribute key-value table into a matrix representation and a vector representation, the query encoder is set to convert the query cluster into a matrix representation and a vector representation, and then the decoder perform decoding to generate the rewriting title template.

In step 130, the placeholder in the rewritten title template is replaced with the corresponding preset information so that the rewritten title template is converted into a rewritten title.

Before the advertisement title is rewritten by using the preset neural network model, the advertisement title is converted into the title template; then, after the advertisement title is rewritten by using the preset neural network model, the rewritten title template needs to be converted into the rewritten title. The rewritten title template may be filled with key-value pairs of pre-extracted sensitive information so that a complete sentence is obtained, and then the rewritten title template is converted into the rewritten title.

According to the technical solution in the embodiment, the preset information in the advertisement title is replaced with the placeholder, and then the advertisement title is rewritten by the preset neural network model. In this manner, the problem of achieving information consistency before and after advertisement title rewriting is solved, that is, information consistency between the rewritten advertisement title and the original advertisement title is ensured.

Embodiment Two

Figure 2:
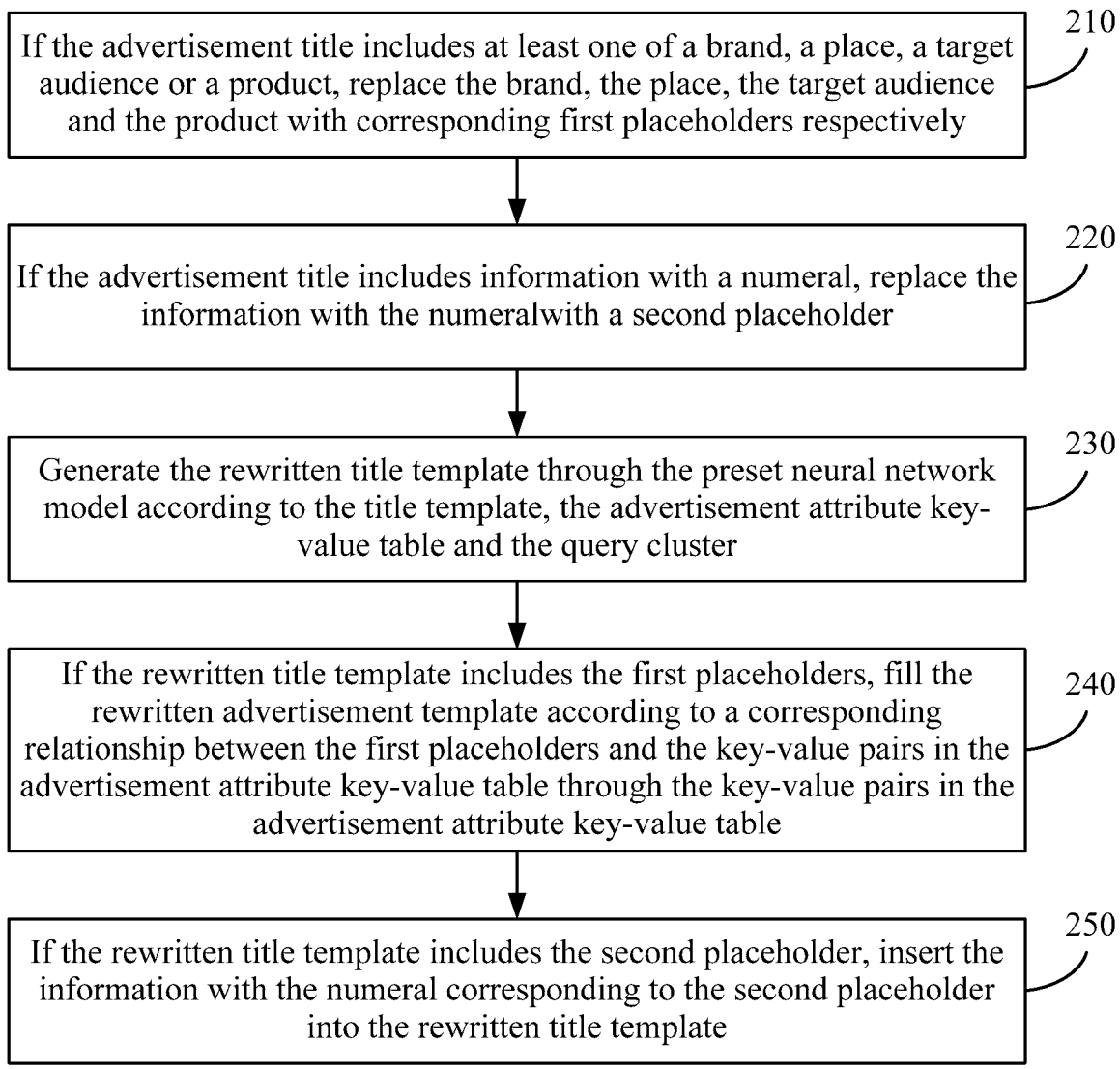
FIG. 2 is a flowchart of an advertisement title rewriting method according to embodiment two of the present application.

FIG. 2 is a flowchart of an advertisement title rewriting method according to embodiment two of the present application. The embodiment refines the preceding technical solution. The method includes steps described below.

In step 210, if the advertisement title includes at least one of a brand, a place, a target audience or a product, the brand, the place, the target audience and the product are replaced with corresponding first placeholders respectively.

A first placeholder corresponds to a key-value pair in the advertisement attribute key-value table. Sensitive information may be recognized as key-value pairs from the original advertisement title and the rewritten title by using a named entity recognition (NER) model. The NER model is trained based on a large amount of advertisement data by using a self-designed advertisement NER identifier. Based on the pre-extracted sensitive information, the sensitive information in the original advertisement title is replaced with the placeholder. Exemplarily, an extracted value in the title may be replaced with a key of the extracted value which serves as a placeholder so that the title template is obtained. In the training of the preset neural network model, the preset neural network model may be trained by using the title template. In the process of title rewriting, only the sensitive information is extracted from the original advertisement title since the original advertisement title cannot be used. A problem during the process of title rewriting is that the preset neural network model attempts to decode a sentence having a placeholder, but the recognized information lacks a key. A constrained decoding algorithm may be used for preventing the preset neural network model decoding such an unanalyzable placeholder. The constrained decoding algorithm uses a key placeholder calculated from an extracted key-value table to mask the unanalyzable placeholder. Once no key is extracted from the original advertisement title, the preset neural network model is not allowed to decode the placeholder of the original advertisement title. Therefore, any title template decoded by the preset neural network model is analyzable.

In step 220, if the advertisement title includes information with a numeral, the information with the numeral is replaced with a second placeholder.

The second placeholder is used for indicating that the preset neural network model does not perform decoding processing on the second placeholder. How to handle the price is also a problem during advertisement title rewriting. The neural network model cannot handle a numeral such as the price, since the meaning of the numeral is different according to the context. A price segment may be ambiguous since the price segment may refer to a price or a discount we expected. Although the price and the discount are both related to money, a price placeholder in the title template being replaced with a real price may has entirely different meaning from the price placeholder in the title being replaced with a discount. Mistakenly replacing a price placeholder with discount information will lead to false advertising. However, one advantage of price information/discount information is that the price information/discount information provides accurate information which is conducive to improving the attraction of the advertisement title. Therefore, sub-content (for example, a price/a discount) with a numeral is retained in the original advertisement title, and the sub-content with the numeral is inserted into the generated rewritten title. Empirically, it has been found that inserting the sub-content with the numeral before the rewritten title is generated does not affect the fluency of the title.

In step 230, the rewritten title template is generated through the preset neural network model according to the title template, the advertisement attribute key-value table and the query cluster.

In step 240, if the rewritten title template includes the first placeholders, the rewritten advertisement template is filled, according to a corresponding relationship between the first placeholders and the key-value pairs in the advertisement attribute key-value table, through the key-value pairs in the advertisement attribute key-value table.

In step 250, if the rewritten title template includes the second placeholder, the information with the numeral corresponding to the second placeholder is inserted into the rewritten title template.

Information in the rewritten title is ensured to be consistent with information in the original advertisement title through placeholders, so that the robustness of the neural network model is improved.

Optionally, the step in which the rewritten title template is generated through the preset neural network model according to the title template, the advertisement attribute key-value table and the query cluster includes steps described below.

A context word vector representation of the advertisement title is generated through a title encoder to form a matrix representation of the advertisement title. A backbone neural network model is composed of title encoder $f^S(\bullet)$, key-value encoder $f^{KV}(\bullet)$, query encoder $f^Q(\bullet)$ and decoder $g(\bullet)$. Title encoder $f^S(\bullet)$ is implemented as a transformer to generate context word vector representation $h_{1:M}^S$, where $h_{1:M}^S \in \mathbb{R}^{M \times d}$, of the advertisement title by using multi-head self-attention and form the matrix representation of the advertisement title. The context word vector of the advertisement tile is denoted as formula (1) below.

$$h_{1:M}^S = \text{transformer}(S_{1:M}) \qquad (1).$$

$S_{1:M}$ represents an original title.

A vector representation of the advertisement title is generated using a maximum pooling layer and a linear layer on a sequence dimension according to the matrix representation of the advertisement title. Vector representation $\tilde{h}^S$, where $\tilde{h}^S \in \mathbb{R}^d$, of the advertisement title is denoted as formula (2) below.

$$\tilde{h}^S = W^S \times \text{max-pooling}(h_{1:M}^S) \qquad (2).$$

Context word vector $h_{1:M}^S$ and dense representation $\tilde{h}^S$ (that is, the vector representation of the advertisement title) are considered as two different methods for representing a sentence as a matrix and a vector separately. These two representations may be used differently for continuously calculations.

A single value of the advertisement attribute key-value table is encoded into a latent representation of the single value through the key-value encoder, where key-value encoder $f^{KV}(\bullet)$ refers to a hierarchical transformer composed of a value transformer and a key transformer. The value transformer encodes single value $v_{i,1:l_i}$ into latent representation $h_{i,1:l_i}^v$, where $h_{i,1:l_i}^v \in \mathbb{R}^{l_i \times d}$, of the single value as formula (3) below.

$$h_{i,1:l_i}^v = \text{transformer}(v_{i,1:l_i}) \qquad (3).$$

$l_i$ denotes the length of given value $v_i$.

A vector representation of the single value is generated using the maximum pooling layer on the sequence dimension according to the latent representation of the single value. Vector representation $h_i^v$, where $\tilde{h}_i^v \in \mathbb{R}^d$ of $v_i$ is calculated through the maximum pooling layer on the sequence dimension as formula (4) below.

$$\tilde{h}_i^v = \text{max-pooling}(h_{i,1:l_i}^v) \qquad (4).$$

It is to be noted that values in the key-value table is considered to be a succinct attribute and should be shorter than the title, and may be merged to the maximum extent so that a compact meaning is obtained without losing too much information.

The vector representation of the single value and a key corresponding to the single value are fused into a fusion representation of the single value. After vector representation $\tilde{h}_{i,1:l_i}^v$ of the single value is calculated, $\tilde{h}_{i,1:l_i}^v$ and key representation $k_i$ corresponding to the single value are fused.

Fusion representations of all values in the advertisement attribute key-value table are encoded into a context key-value vector representation of the advertisement attribute key-value table through a no-position transformer to form a matrix representation of the advertisement attribute key-value table. Fused fusion representations are encoded through the no-position transformer into context key-value vector representation $h_{1:K}^{KV}$, where $h_{1:K}^{KV} \in \mathbb{R}^{K \times d}$, as formula (5) below.

$$h_{1:K}^{KV} = \text{transformer}_{w/o\ pos}(\tilde{h}_{1:K}^v + k_{1:K}) \qquad (5).$$

Here, a transformer without position embedding (that is, a no-position transformer), rather than an original transformer, is used since key-value pairs in the table are positionless.

A vector representation of the advertisement attribute key-value table is generated using the maximum pooling layer on the sequence dimension according to the context key-value vector representation of the advertisement attribute key-value table. As the processing in the title encoder, vector representation $\tilde{h}^{KV}$, where $\tilde{h}^{KV} \in \mathbb{R}^d$, of the key-value table is also calculated as formula (6) below.

$$\tilde{h}^{KV} = W^{KV} \times \text{max-pooling}(h_{1:K}^{KV}) \qquad (6).$$

Here, a maximum pooling operation is performed on a key dimension.

A context word vector representation of a user query is generated through the query encoder to form a matrix representation of the user query.

A vector representation of the user query is generated using the maximum pooling layer and the linear layer on the sequence dimension according to the matrix representation of the user query. The design of query encoder $f^Q(\bullet)$ is the same as the design of title encoder $f^S(\bullet)$. Query $Q_{1:L}$ is given; the query encoder first generates a context word representation through the transformer as matrix representation $h_{1:L}^Q$, where $h_{1:L}^Q \in \mathbb{R}^{L \times d}$, and then calculates vector representation $\tilde{h}^Q$, where $\tilde{h}^Q \in \mathbb{R}^d$, of the query through the maximum pooling layer on the sequence dimension as formulas (7) and (8).

$$h_{1:M}^Q = \text{transformer}(Q_{1:M}) \quad (7)$$

$$\tilde{h}^Q = W^Q \times \text{max-pooling}(h_{1:M}^Q) \quad (8).$$

The vector representation of the advertisement title, the vector representation of the advertisement attribute key-value table and the vector representation of the user query are added so that an initial seed of a preset neural network decoder is generated. Optionally, the preset neural network decoder is a long-short term memory (LSTM) decoder.

The matrix representation of the advertisement title, the matrix representation of the advertisement attribute key-value table and the matrix representation of the user query are connected to that a memory is created.

The rewritten title template is generated through the preset neural network decoder according to the initial seed and the memory.

Optionally, the step in which the rewritten title template is generated through the preset neural network decoder according to the initial seed and the memory includes the step described below. The memory is accessed through the LSTM decoder via multi-hop attention and multi-head attention, and the rewritten title template is autoregressively generated according to the initial seed and the memory.

The advertisement title, the query, the matrix representation of the key-value table and the vector representation of the key-value table exist, and then decoder $g(\bullet)$ needs to generate a high-quality new title. The decoder and the LSTM are used for quick decoding. The input vector representations, that is, $\tilde{h}^S$, $\tilde{h}^{KV}$ and $\tilde{h}^Q$, are added so that the initial seed of the LSTM decoder is generated as formula (9) below.

$$\text{seed} = \tilde{h}^S + \tilde{h}^{KV} + \tilde{h}^Q \quad (9).$$

At the same time, the matrix representations, that is, $h_{1:M}^S$, $h_{1:K}^{KV}$ and $h_{1:L}^Q$, respectively, are connected so that memory H, where $H \in \mathbb{R}^{(M+K+L) \times d}$, for input is generated as formula (10) below.

$$H = [h_{1:M}^S; h_{1:K}^{KV}; h_{1:L}^Q] \quad (10).$$

The LSTM decoder accesses memory H via multi-hop attention and multi-head attention so that the output title is aligned with the input title. The seed and the memory are given, and then the decoder autoregressively generates rewritten title $O_{1:T}$ as formula (11) below.

$$O_{1:T} = \text{LSTM}(\text{seed}, H) \quad (11).$$

In the formula, T denotes the length of the generated title and is determined by the autoregressive generation process.

Optionally, before the rewritten title template is generated through the preset neural network model according to the title template, the advertisement attribute key-value table and the query cluster, steps described below are further included.

A query in an online search is acquired.

An advertisement matching the query and an advertisement attribute table corresponding to the advertisement are retrieved from an advertisement database according to the query.

A pair of a low click-through rate title and a high click-through rate title is constructed according to the query and the advertisement matching the query, where the high click-through rate title is obtained by the preset neural network model rewriting the low click-through rate title.

An array of the low click-through rate title, the advertisement attribute table, the query and the high click-through rate title is constructed as rewriting data.

The rewriting data is divided into a data set with the query and a data set without the query according to whether an online advertisement includes the query.

The preset neural network model is trained by using the data set without the query so that a title encoder, a table encoder and a title decoder are obtained.

A query encoder is created, and the query encoder is inserted into a codec architecture.

The preset neural network model is trained by using the data set with the query so that a trained query encoder is acquired, and the title decoder is taught to use query information so that the preset neural network model is obtained through training.

Data with the query or data without the query may be constructed from real online advertisements, and the neural network model is trained in a cascaded manner. The data with the query is denoted as $\mathcal{D}_{w/Q}$, and the data without the query is denoted as $\mathcal{D}_{w/o\ Q}$.

The rewriting data is defined, for example, as the array of the low click-through rate title, the advertisement attribute table, the query and the high click-through rate title. The construction of the rewriting data is as below.

(1) A query is randomly selected from an online search.

(2) A advertisement title matching the query and an advertisement attribute table corresponding to the advertisement title are retrieved, according to a query result, from an advertisement database through an advertisement recommendation system.

(3) According to the given query and advertisement conditions, a pair of a low click-through rate title and a high click-through rate title is constructed, where the low click-through rate title is rewritten by the preset neural network model for title rewriting into the high click-through rate title.

However, in the construction process of data $\mathcal{D}_{w/Q}$, it is found that even in query clustering technology, it is still difficult to acquire a confident sample/array of which the frequency is more than threshold 5. Since the space of a rewritten sample is equal to the Cartesian product of an advertisement set and a query set, the space of a rewritten sample is very sparse. This sparse space causes the frequency of most of queries or query clusters is relatively low. For high-quality training, only a training sample less than 1 megabyte (M) is set.

To better learn a language model, the idea of extensive pre-training is used, such as Bidirectional Encoder Representation from Transformers (BERT) and Generative Pre-Training (GPT). Upstream data set $\mathcal{D}_{w/o\ Q}$ is further constructed by marginalizing a sample space on a query dimension. Data set $\mathcal{D}_{w/o\ Q}$ is composed of samples defined as part of arrays that has no search query compared with an original array. Part of arrays with no search query are easier to acquire. Eliminating one element in a sample array will lead to marginalization of queries of different heights, so that the size of the sample space is significantly reduced, and thus the frequency that the sample appears is higher. According to the larger-scale $\mathcal{D}_{w/o\ Q}$ and the smaller-scale $\mathcal{D}_{w/o\ Q}$, an the neural network model is trained in the cascaded manner. The neural network model is first trained using $\mathcal{D}_{w/o\ Q}$ so that three well-trained modules, including a title encoder, a table encoder and a title decoder, are obtained. A new query encoder is then created and inserted into a codec architecture. The new codec model is fine-tuned based on the smaller-scale $\mathcal{D}_{w/o\ Q}$ so that a well-trained query encoder is acquired, and the title decoder is taught to use query information.

The neural network model is trained by using the cascaded training method, so that the problem of insufficient data can be alleviated.

Embodiment Three

Figure 3:
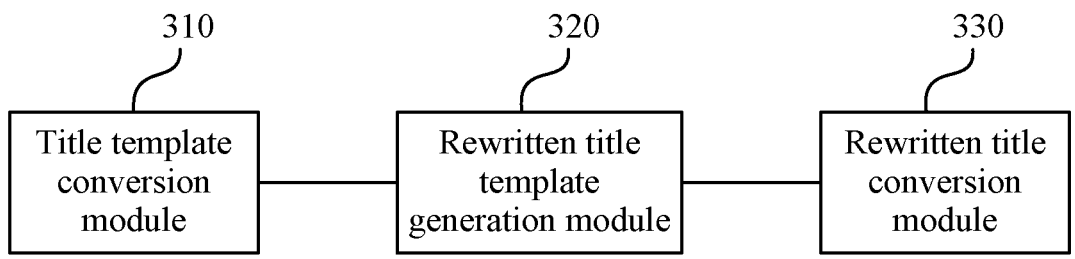
FIG. 3 is a structural diagram of an advertisement title rewriting apparatus according to embodiment three of the present application.

FIG. 3 is a structural diagram of an advertisement title rewriting apparatus according to embodiment three of the present application. The advertisement title rewriting apparatus provided in the embodiment may be integrated in an advertisement title rewriting device such as a back-end server. The apparatus includes a title template conversion module 310, a rewritten title template generation module 320 and a rewritten title conversion module 330.

The title template conversion module 310 is configured to replace preset information in an advertisement title with a corresponding placeholder to convert the advertisement title into a title template.

The rewritten title template generation module 320 is configured to generate, through a preset neural network model, a rewritten title template according to the title template, an advertisement attribute key-value table and a query cluster.

The rewritten title conversion module 330 is configured to replace the placeholder in the rewritten title template with the corresponding preset information to convert the rewritten title template into a rewritten title.

According to the technical solution in the embodiment, the preset information in the advertisement title is replaced with the placeholder, and then the advertisement title is rewritten by the preset neural network model. In this manner, the problem of achieving information consistency before and after advertisement title rewriting is solved, that is, information consistency between the rewritten advertisement title and the original advertisement title is ensured.

Optionally, the title template conversion module is configured to perform steps described below.

If the advertisement title includes at least one of a brand, a place, a target audience or a product, the brand, the place, the target audience and the product are replaced with corresponding first placeholders respectively, where the first placeholders correspond to key-value pairs in the advertisement attribute key-value table.

If the advertisement title includes information with a numeral, the information with the numeral is replaced with a second placeholder, where the second placeholder is used for indicating that the preset neural network model does not perform decoding processing on the second placeholder.

Optionally, the rewritten title conversion module is configured to perform steps described below.

If the rewritten title template includes the first placeholders, the rewritten advertisement template is filled, according to a corresponding relationship between the first placeholders and the key-value pairs in the advertisement attribute key-value table, through the key-value pairs in the advertisement attribute key-value table.

If the rewritten title template includes the second placeholder, the information with the numeral corresponding to the second placeholder is inserted into the rewritten title template.

Optionally, the rewritten title template generation module includes an advertisement title matrix representation unit, an advertisement title vector representation unit, a value latent representation unit, a value vector representation unit, a value fusion representation unit, a key-value table matrix representation unit, a key-value table vector representation unit, a query matrix representation unit, a query vector representation unit, a decoder seed generation unit, a memory creation unit and a rewritten title unit.

The advertisement title matrix representation unit is configured to generate a context word vector representation of the advertisement title through a title encoder to form a matrix representation of the advertisement title.

The advertisement title vector representation unit is configured to generate, using a maximum pooling layer and a linear layer on a sequence dimension, a vector representation of the advertisement title according to the matrix representation of the advertisement title.

The value latent representation unit is configured to encode a single value of the advertisement attribute key-value table into a latent representation of the single value through a key-value encoder.

The value vector representation unit is configured to generate, using the maximum pooling layer on the sequence dimension, a vector representation of the single value according to the latent representation of the single value.

The value fusion representation unit is configured to fuse the vector representation of the single value and a key corresponding to the single value into a fusion representation of the single value.

The key-value table matrix representation unit is configured to encode fusion representations of all values in the advertisement attribute key-value table into a context key-value vector representation of the advertisement attribute key-value table through a no-position transformer to form a matrix representation of the advertisement attribute key-value table.

The key-value table vector representation unit is configured to generate, using the maximum pooling layer on the sequence dimension, a vector representation of the advertisement attribute key-value table according to the context key-value vector representation of the advertisement attribute key-value table.

The query matrix representation unit is configured to generate a context word vector representation of a user query through a query encoder to form a matrix representation of the user query.

The query vector representation unit is configured to generate, using the maximum pooling layer and the linear layer on the sequence dimension, a vector representation of the user query according to the matrix representation of the user query.

The decoder seed generation unit is configured to add the vector representation of the advertisement title, the vector representation of the advertisement attribute key-value table and the vector representation of the user query to generate an initial seed of a preset neural network decoder.

The memory creation unit is configured to connect the matrix representation of the advertisement title, the matrix representation of the advertisement attribute key-value table and the matrix representation of the user query to create a memory.

The rewritten title unit is configured to generate, through the preset neural network decoder, the rewritten title template according to the initial seed and the memory.

Optionally, the preset neural network decoder is a long-short term memory (LSTM) decoder.

The rewritten title unit is configured to access the memory through the LSTM decoder via multi-hop attention and multi-head attention, and autoregressively generate the rewritten title template according to the initial seed and the memory.

Optionally, the advertisement title rewriting apparatus further includes a query acquisition module, an advertisement matching module, a title pair construction module, a rewriting data construction module, a data division module, a part model training module, a query encoder creation module and a model training module.

The query acquisition module is configured to acquire a query in an online search before the rewritten title template is generated through the preset neural network model according to the title template, the advertisement attribute key-value table and the query cluster.

The advertisement matching module is configured to retrieve an advertisement matching the query and an advertisement attribute table corresponding to the advertisement from an advertisement database according to the query.

The title pair construction module is configured to construct a pair of a low click-through rate title and a high click-through rate title according to the query and the advertisement matching the query, where the high click-through rate title is obtained by the preset neural network model rewriting the low click-through rate title.

The rewriting data construction module is configured to construct an array of the low click-through rate title, the advertisement attribute table, the query and the high click-through rate title as rewriting data.

The data division module is configured to divide the rewriting data into a data set with the query and a data set without the query according to whether an online advertisement includes the query.

The part model training module is configured to train the preset neural network model by using the data set without the query to obtain a title encoder, a table encoder and a title decoder.

The query encoder creation module is configured to create a query encoder, and insert the query encoder into a codec architecture.

The model training module is configured to train the preset neural network model by using the data set with the query to acquire a trained query encoder, and teach the title decoder to use query information to obtain the preset neural network model through training.

The advertisement title rewriting apparatus provided in embodiment of the present application may perform the advertisement title rewriting method provided in any embodiment of the present application and has functional modules for performing the method.

Embodiment Four

Figure 4:
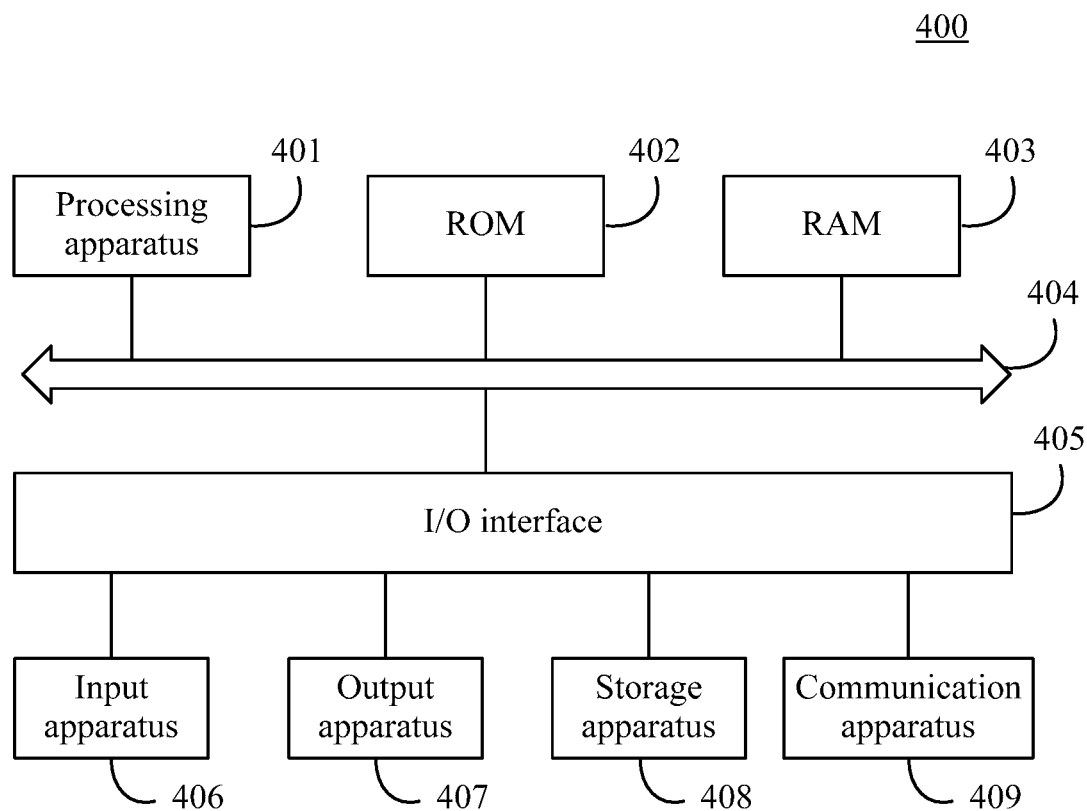
FIG. 4 is a structural diagram of an advertisement title rewriting device according to embodiment four of the present application.

Referring to FIG. 4, FIG. 4 is a structural diagram of an advertisement title rewriting device 400 suitable for implementing embodiments of the present disclosure. The advertisement title rewriting device in embodiments of the present disclosure may include, but is not limited to, mobile terminals such as a mobile phone, a laptop, a digital broadcast receiver, a personal digital assistant (PDA), a portable Android device (PAD), a portable media player (PMP) and an in-vehicle terminal (such as an in-vehicle navigation terminal) and stationary terminals such as a digital television (TV) and a desktop computer. The advertisement title rewriting device shown in FIG. 4 is merely an example and should not impose any limitation to the function and usage scope of the embodiments of the present disclosure.

As shown in FIG. 4, the advertisement title rewriting device 400 may include a processing apparatus (such as a central processing unit or a graphics processing unit) 401. The processing apparatus 401 may perform various proper actions and processing according to a program stored in a read-only memory (ROM) 402 or a program loaded into a random-access memory (RAM) 403 from a storage apparatus 406. Various programs and data required for operations of the electronic device 400 are also stored in the RAM 403. The processing apparatus 401, the ROM 402 and the RAM 403 are connected to each other through a bus 404. An input/output (I/O) interface 405 is also connected to the bus 404.

Generally, the following apparatuses may be connected to the I/O interface 405: an input apparatus 406 such as a touch screen, a touchpad, a keyboard, a mouse, a camera, a microphone, an accelerometer or a gyroscope; an output apparatus 407 such as a liquid crystal display (LCD), a speaker or a vibrator; the storage apparatus 406 such as a magnetic tape or a hard disk; and a communication apparatus 409. The communication apparatus 409 may allow the advertisement title rewriting device 400 to perform wireless or wired communication with other devices to exchange data. Although FIG. 4 shows the advertisement title rewriting device 400 having various apparatuses, it is to be understood that not all of the apparatuses shown here need to be implemented or present. Alternatively, more or fewer apparatuses may be implemented.

Particularly, according to embodiments of the present disclosure, the processes described above with reference to the flowcharts may be implemented as computer software programs. For example, an embodiment of the present disclosure includes a computer program product. The computer program product includes a computer program carried on a non-transitory computer-readable medium. The computer program includes program codes for performing the methods illustrated in the flowcharts. In such an embodiment, the computer program may be downloaded and installed from a network through the communication apparatus 409, installed from the storage apparatus 406, or installed from the ROM 402. When the computer program is executed by the processing apparatus 401, the preceding functions defined in the methods in the embodiments of the present disclosure are implemented.

It is to be noted that the preceding computer-readable medium in the present disclosure may be a computer-readable signal medium or a computer-readable storage medium or any combination thereof. For example, the computer-readable storage medium may be, but is not limited to, an electrical, magnetic, optical, electromagnetic, infrared or semiconductor system, apparatus or device or any combination thereof. Specifically, the computer-readable storage medium may include, but is not limited to, an electrical connection having one or more wires, a portable computer disk, a hard disk, a random-access memory (RAM), a read-only memory (ROM), an erasable programmable read-only memory (EPROM) or flash memory, an optical fiber, a portable compact disc read-only memory (CD-ROM), an optical memory device, a magnetic memory device or any suitable combination thereof. In the present disclosure, the computer-readable storage medium may be any tangible medium including or storing a program. The program may be used by or in conjunction with an instruction execution system, apparatus or device. In the present disclosure, however, the computer-readable signal medium may include a data signal propagated in baseband or as part of a carrier wave, where computer-readable program codes are carried in the data signal. The data signal propagated in this manner may be in various forms, including, but not limited to, an electromagnetic signal, an optical signal or any appropriate combination thereof. The computer-readable signal medium may also be any computer-readable medium other than the computer-readable storage medium. The computer-readable signal medium may send, propagate or transmit a program used by or in conjunction with an instruction execution system, apparatus or device. Program codes included on the computer-readable medium may be transmitted by any suitable medium, including, but not limited to, a wire, an optical cable, a radio frequency (RF) or any suitable combination thereof.

In some embodiments, clients and servers may communicate using any network protocol currently known or to be developed in the future, such as the HyperText Transfer Protocol (HTTP), and may be interconnected with any form or medium of digital data communication (such as a communication network). Examples of the communication network include a local area network (LAN), a wide area networks (WAN), an internet (for example, the Internet), a peer-to-peer network (for example, an Ad-Hoc network) and any network currently known or to be developed in the future.

The preceding computer-readable medium may be included in the preceding advertisement title rewriting device or may exist alone without being assembled into the advertisement title rewriting device.

The preceding computer-readable medium carries at least one program which, when executed by the advertisement title rewriting device, causes the advertisement title rewriting device to replace preset information in an advertisement title with a corresponding placeholder to convert the advertisement title into a title template; generate, through a preset neural network model, a rewritten title template according to the title template, an advertisement attribute key-value table and a query cluster; and replace the placeholder in the rewritten title template with the corresponding preset information to convert the rewritten title template into a rewritten title.

Optionally, the preceding at least one program, when executed by the advertisement title rewriting device, causes the advertisement title rewriting device to perform the advertisement title rewriting method according to any embodiment of the present application.

Computer program codes for executing operations in the present disclosure may be written in one or more programming languages or a combination thereof. The preceding programming languages include, but are not limited to, an object-oriented programming language such as Java, Smalltalk or C++ and may also include a conventional procedural programming language such as C or a similar programming language. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or may be connected to an external computer (for example, via the Internet through an Internet service provider).

The flowcharts and block diagrams in the drawings show the possible architecture, functions and operations of the system, method and computer program product according to various embodiments of the present disclosure. In this regard, each block in the flowcharts or block diagrams may represent a module, program segment or part of codes, where the module, program segment or part of codes includes at least one executable instruction for implementing specified logical functions. It is also to be noted that in some alternative implementations, the functions marked in the blocks may be implemented in an order different from those marked in the drawings. For example, two successive blocks may, in fact, be performed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system executing specified functions or operations or may be implemented by a combination of special-purpose hardware and computer instructions.

The units involved in embodiments of the present disclosure may be implemented by software or hardware. The names of the units do not constitute a limitation on the units themselves. For example, a first acquisition unit may also be described as "a unit for acquiring at least two Internet protocol addresses".

The functions described above herein may be at least partially implemented by at least one hardware logic component. For example, without limitation, example types of hardware logic components that can be used include a field-programmable gate array (FPGA), an application-specific integrated circuit (ASIC), an application-specific standard product (ASSP), a system on a chip (SoC), a complex programmable logic device (CPLD) and the like.

In the context of the present disclosure, a machine-readable medium may be a tangible medium that may include or store a program used by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any appropriate combination thereof. Concrete examples of the machine-readable storage medium include an electrical connection based on at least one wire, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device or any suitable combination thereof.

According to at least one embodiment of the present disclosure, an advertisement title rewriting method is provided. The method includes steps described below.

Preset information in an advertisement title is replaced with a corresponding placeholder so that the advertisement title is converted into a title template.

A rewritten title template is generated through a preset neural network model according to the title template, an advertisement attribute key-value table and a query cluster.

The placeholder in the rewritten title template is replaced with the corresponding preset information so that the rewritten title template is converted into a rewritten title.

The step in which the preset information in an advertisement title is replaced with the corresponding placeholder so that the advertisement title is converted into the title template includes steps described below.

If the advertisement title includes at least one of a brand, a place, a target audience or a product, the brand, the place, the target audience and the product are replaced with corresponding first placeholders respectively, where the first placeholders correspond to key-value pairs in the advertisement attribute key-value table.

If the advertisement title includes information with a numeral, the information with the numeral is replaced with a second placeholder, where the second placeholder is used for indicating that the preset neural network model does not perform decoding processing on the second placeholder.

The step in which the placeholder in the rewritten title template is replaced with the corresponding preset information so that the rewritten title template is converted into a rewritten title includes steps described below.

If the rewritten title template includes the first placeholders, the rewritten advertisement template is filled, according to a corresponding relationship between the first placeholders and the key-value pairs in the advertisement attribute key-value table, through the key-value pairs in the advertisement attribute key-value table.

If the rewritten title template includes the second placeholder, the information with the numeral corresponding to the second placeholder is inserted into the rewritten title template.

The step in which the rewritten title template is generated through the preset neural network model according to the title template, the advertisement attribute key-value table and the query cluster includes steps described below.

A context word vector representation of the advertisement title is generated through a title encoder to form a matrix representation of the advertisement title.

A vector representation of the advertisement title is generated using a maximum pooling layer and a linear layer on a sequence dimension according to the matrix representation of the advertisement title.

A single value of the advertisement attribute key-value table is encoded into a latent representation of the single value through a key-value encoder.

A vector representation of the single value is generated using the maximum pooling layer on the sequence dimension according to the latent representation of the single value.

The vector representation of the single value and a key corresponding to the single value are fused into a fusion representation of the single value.

Fusion representations of all values in the advertisement attribute key-value table are encoded into a context key-value vector representation of the advertisement attribute key-value table through a no-position transformer to form a matrix representation of the advertisement attribute key-value table.

A vector representation of the advertisement attribute key-value table is generated using the maximum pooling layer on the sequence dimension according to the context key-value vector representation of the advertisement attribute key-value table.

A context word vector representation of a user query is generated through a query encoder to form a matrix representation of the user query.

A vector representation of the user query is generated using the maximum pooling layer and the linear layer on the sequence dimension according to the matrix representation of the user query.

The vector representation of the advertisement title, the vector representation of the advertisement attribute key-value table and the vector representation of the user query are added so that an initial seed of a preset neural network decoder is generated.

The matrix representation of the advertisement title, the matrix representation of the advertisement attribute key-value table and the matrix representation of the user query are connected so that a memory is created.

The rewritten title template is generated through the preset neural network decoder according to the initial seed and the memory.

The preset neural network decoder is a long-short term memory (LSTM) decoder.

The step in which the rewritten title template is generated through the preset neural network decoder according to the initial seed and the memory includes the step described below.

The memory is accessed through the LSTM decoder via multi-hop attention and multi-head attention, and the rewritten title template is autoregressively generated according to the initial seed and the memory.

Before the rewritten title template is generated through the preset neural network model according to the title template, the advertisement attribute key-value table and the query cluster, steps described below are further included.

A query in an online search is acquired.

An advertisement matching the query and an advertisement attribute table corresponding to the advertisement are retrieved from an advertisement database according to the query.

A pair of a low click-through rate title and a high click-through rate title is constructed according to the query and the advertisement matching the query, where the high click-through rate title is obtained by the preset neural network model rewriting the low click-through rate title.

An array of the low click-through rate title, the advertisement attribute table, the query and the high click-through rate title is constructed as rewriting data.

The rewriting data is divided into a data set with the query and a data set without the query according to whether an online advertisement includes the query.

The preset neural network model is trained by using the data set without the query so that a title encoder, a table encoder and a title decoder are obtained.

A query encoder is created, and the query encoder is inserted into a codec architecture.

The preset neural network model is trained by using the data set with the query so that a trained query encoder is acquired, and the title decoder is taught to use query information so that the preset neural network model is obtained through training.

According to at least one embodiment of the present disclosure, an advertisement title rewriting apparatus is provided. The apparatus includes a title template conversion module, a rewritten title template generation module and a rewritten title conversion module.

The title template conversion module is configured to replace preset information in an advertisement title with a corresponding placeholder to convert the advertisement title into a title template.

The rewritten title template generation module is configured to generate, through a preset neural network model, a rewritten title template according to the title template, an advertisement attribute key-value table and a query cluster.

The rewritten title conversion module is configured to replace the placeholder in the rewritten title template with the corresponding preset information to convert the rewritten title template into a rewritten title.

The title template conversion module is configured to perform steps described below.

If the advertisement title includes at least one of a brand, a place, a target audience or a product, the brand, the place, the target audience and the product are replaced with corresponding first placeholders respectively, where the first placeholders correspond to key-value pairs in the advertisement attribute key-value table.

If the advertisement title includes information with a numeral, the information with the numeral is replaced with a second placeholder, where the second placeholder is used for indicating that the preset neural network model does not perform decoding processing on the second placeholder.

The rewritten title conversion module is configured to perform steps described below.

If the rewritten title template includes the first placeholders, the rewritten advertisement template is filled, according to a corresponding relationship between the first placeholders and the key-value pairs in the advertisement attribute key-value table, through the key-value pairs in the advertisement attribute key-value table.

If the rewritten title template includes the second placeholder, the information with the numeral corresponding to the second placeholder is inserted into the rewritten title template.

The rewritten title template generation module includes an advertisement title matrix representation unit, an advertisement title vector representation unit, a value latent representation unit, a value vector representation unit, a value fusion representation unit, a key-value table matrix representation unit, a key-value table vector representation unit, a query matrix representation unit, a query vector representation unit, a decoder seed generation unit, a memory creation unit and a rewritten title unit.

The advertisement title matrix representation unit is configured to generate a context word vector representation of the advertisement title through a title encoder to form a matrix representation of the advertisement title.

The advertisement title vector representation unit is configured to generate, using a maximum pooling layer and a linear layer on a sequence dimension, a vector representation of the advertisement title according to the matrix representation of the advertisement title.

The value latent representation unit is configured to encode a single value of the advertisement attribute key-value table into a latent representation of the single value through a key-value encoder.

The value vector representation unit is configured to generate, using the maximum pooling layer on the sequence dimension, a vector representation of the single value according to the latent representation of the single value.

The value fusion representation unit is configured to fuse the vector representation of the single value and a key corresponding to the single value into a fusion representation of the single value.

The key-value table matrix representation unit is configured to encode fusion representations of all values in the advertisement attribute key-value table into a context key-value vector representation of the advertisement attribute key-value table through a no-position transformer to form a matrix representation of the advertisement attribute key-value table.

The key-value table vector representation unit is configured to generate, using the maximum pooling layer on the sequence dimension, a vector representation of the advertisement attribute key-value table according to the context key-value vector representation of the advertisement attribute key-value table.

The query matrix representation unit is configured to generate a context word vector representation of a user query through a query encoder to form a matrix representation of the user query.

The query vector representation unit is configured to generate, using the maximum pooling layer and the linear layer on the sequence dimension, a vector representation of the user query according to the matrix representation of the user query.

The decoder seed generation unit is configured to add the vector representation of the advertisement title, the vector representation of the advertisement attribute key-value table and the vector representation of the user query to generate an initial seed of a preset neural network decoder.

The memory creation unit is configured to connect the matrix representation of the advertisement title, the matrix representation of the advertisement attribute key-value table and the matrix representation of the user query to create a memory.

The rewritten title unit is configured to generate, through the preset neural network decoder, the rewritten title template according to the initial seed and the memory.

The preset neural network decoder is a long-short term memory (LSTM) decoder.

The rewritten title unit is configured to access the memory through the LSTM decoder via multi-hop attention and multi-head attention, and autoregressively generate the rewritten title template according to the initial seed and the memory.

The advertisement title rewriting apparatus further includes a query acquisition module, an advertisement matching module, a title pair construction module, a rewriting data construction module, a data division module, a part model training module, a query encoder creation module and a model training module.

The query acquisition module is configured to acquire a query in an online search before the rewritten title template is generated through the preset neural network model according to the title template, the advertisement attribute key-value table and the query cluster.

The advertisement matching module is configured to retrieve an advertisement matching the query and an advertisement attribute table corresponding to the advertisement from an advertisement database according to the query.

The title pair construction module is configured to construct a pair of a low click-through rate title and a high click-through rate title according to the query and the advertisement matching the query, where the high click-through rate title is obtained by the preset neural network model rewriting the low click-through rate title.

The rewriting data construction module is configured to construct an array of the low click-through rate title, the advertisement attribute table, the query and the high click-through rate title as rewriting data.

The data division module is configured to divide the rewriting data into a data set with the query and a data set without the query according to whether an online advertisement includes the query.

The part model training module is configured to train the preset neural network model by using the data set without the query to obtain a title encoder, a table encoder and a title decoder.

The query encoder creation module is configured to create a query encoder, and insert the query encoder into a codec architecture.

The model training module is configured to train the preset neural network model by using the data set with the query to acquire a trained query encoder, and teach the title decoder to use query information to obtain the preset neural network model through training.

According to at least one embodiment of the present disclosure, an advertisement title rewriting device is further provided. The advertisement title rewriting device includes at least one processor and a memory configured to store at least one program.

The at least one program, when executed by the at least one processor, causes the at least one processor to implement the advertisement title rewriting method according to any embodiment.

According to at least one embodiment of the present disclosure, a storage medium including computer-executable instructions is further provided. The computer-executable instructions, when executed by a computer processor, are configured to perform the advertisement title rewriting method according to any embodiment.

The preceding description is merely illustrative of preferred embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combination of the preceding technical features or their equivalents without departing from the concept of the present disclosure, for example, technical solutions formed by the substitutions of the preceding features with the technical features (not limited to being) disclosed in the present disclosure and having similar functions.

Additionally, although operations are depicted in a particular order, this should not be construed as that these operations are required to be performed in the particular order shown or in a sequential order. In certain circumstances, multitasking and parallel processing may be advantageous. Similarly, although several specific implementation details are included in the preceding discussion, these should not be construed as limitations on the scope of the present disclosure. Certain features described in the context of separate embodiments may also be implemented in combination in a single embodiment. Conversely, various features described in the context of a single embodiment may also be implemented in multiple embodiments individually or in any suitable sub-combination.

What is claimed is:

1. An advertisement title rewriting method, being executed by an electronic device, comprising:
   replacing preset information in an advertisement title with a corresponding placeholder to convert the advertisement title into a title template;
   generating, through a preset neural network model, a rewritten title template according to the title template, an advertisement attribute key-value table and a query cluster; and
   replacing the placeholder in the rewritten title template with the corresponding preset information to convert the rewritten title template into a rewritten title;
   wherein the preset neural network model is composed of a title encoder, a key-value encoder, a query encoder and a decoder;
   wherein generating, through the preset neural network model, the rewritten title template according to the title template, the advertisement attribute key-value table and the query cluster comprises:
   converting the title template into a matrix representation and a vector representation of the title template through the title encoder, converting the advertisement attribute key-value table into a matrix representation and a vector representation of the advertisement attribute key-value table through the key-value encoder, converting the query cluster into a matrix representation and a vector representation of the query cluster through the query encoder, and performing decoding and generating the rewriting title template through the decoder;
   adding the vector representation of the title template, the vector representation of the advertisement attribute key-value table and the vector representation of the query cluster to generate an initial seed of a preset neural network decoder;
   connecting the matrix representation of the title template, the matrix representation of the advertisement attribute key-value table and the matrix representation of the query cluster to create a memory; and
   generating, through the preset neural network decoder, the rewritten title template according to the initial seed and the memory.

2. The advertisement title rewriting method according to claim 1, wherein replacing the preset information in the advertisement title with the corresponding placeholder to convert the advertisement title into the title template comprises:
   in response to the advertisement title comprising at least one of a brand, a place, a target audience or a product, replacing the brand, the place, the target audience and the product with corresponding first placeholders respectively, wherein the first placeholders correspond to key-value pairs in the advertisement attribute key-value table; and
   in response to the advertisement title comprising information with a numeral, replacing the information with the numeral with a second placeholder, wherein the second placeholder is used for indicating that the preset neural network model does not perform decoding processing on the second placeholder.

3. The advertisement title rewriting method according to claim 2, wherein replacing the placeholder in the rewritten title template with the corresponding preset information to convert the rewritten title template into the rewritten title comprises:
   in response to the rewritten title template comprising the first placeholders, filling, according to a corresponding relationship between the first placeholders and the key-value pairs in the advertisement attribute key-value table, the rewritten title template through the key-value pairs in the advertisement attribute key-value table; and
   in response to the rewritten title template comprising the second placeholder, inserting the information with the numeral corresponding to the second placeholder into the rewritten title template.

4. The advertisement title rewriting method according to claim 1, wherein converting the title template into the matrix representation and the vector representation of the title template through the title encoder comprises:

generating a context word vector representation of the title template through the title encoder to form the matrix representation of the title template; and generating, using a maximum pooling layer and a linear layer on a sequence dimension, the vector representation of the title template according to the matrix representation of the title template;

converting the advertisement attribute key-value table into the matrix representation and the vector representation of the advertisement attribute key-value table through the key-value encoder comprises:

encoding a single value of the advertisement attribute key-value table into a latent representation of the single value through the key-value encoder;

generating, using the maximum pooling layer on the sequence dimension, a vector representation of the single value according to the latent representation of the single value;

fusing the vector representation of the single value and a key corresponding to the single value into a fusion representation of the single value;

encoding fusion representations of all values in the advertisement attribute key-value table into a context key-value vector representation of the advertisement attribute key-value table through a no-position transformer to form the matrix representation of the advertisement attribute key-value table; and generating, using the maximum pooling layer on the sequence dimension, the vector representation of the advertisement attribute key-value table according to the context key-value vector representation of the advertisement attribute key-value table; and converting the query cluster into the matrix representation and the vector representation of the query cluster through the query encoder comprises:

generating a context word vector representation of the query cluster through the query encoder to form the matrix representation of the query cluster; and generating, using the maximum pooling layer and the linear layer on the sequence dimension, the vector representation of the query cluster according to the matrix representation of the query cluster.

5. The advertisement title rewriting method according to claim 4, wherein the preset neural network decoder is a long-short term memory (LSTM) decoder; and generating, through the preset neural network decoder, the rewritten title template according to the initial seed and the memory comprises:

accessing the memory through the LSTM decoder via multi-hop attention and multi-head attention, and autoregressively generating the rewritten title template according to the initial seed and the memory.

6. The advertisement title rewriting method according to claim 1, before generating, through the preset neural network model, the rewritten title template according to the title template, the advertisement attribute key-value table and the query cluster, further comprising:

acquiring a query in an online search;

retrieving an advertisement matching the query and an advertisement attribute table corresponding to the advertisement from an advertisement database according to the query;

constructing a pair of a low click-through rate title and a high click-through rate title according to the query and the advertisement matching the query, wherein the high click-through rate title is obtained by the preset neural network model rewriting the low click-through rate title;

constructing an array of the low click-through rate title, the advertisement attribute table, the query and the high click-through rate title as rewriting data;

dividing the rewriting data into a data set with the query and a data set without the query according to whether an online advertisement comprises the query;

training the preset neural network model by using the data set without the query to obtain a title encoder, a table encoder and a title decoder;

creating a query encoder, and inserting the query encoder into a codec architecture; and training the preset neural network model by using the data set with the query to acquire a trained query encoder, and teaching the title decoder to use query information to obtain the preset neural network model through training.

7. An advertisement title rewriting device, comprising:
at least one processor; and
a memory having stored thereon at least one program;
wherein the at least one program, when executed by the at least one processor, causes the at least one processor to:

replace preset information in an advertisement title with a corresponding placeholder to convert the advertisement title into a title template;

generate, through a preset neural network model, a rewritten title template according to the title template, an advertisement attribute key-value table and a query cluster; and replace the placeholder in the rewritten title template with the corresponding preset information to convert the rewritten title template into a rewritten title;

wherein the preset neural network model is composed of a title encoder, a key-value encoder, a query encoder and a decoder;

wherein the at least one program causes the at least one processor to generate, through the preset neural network model, the rewritten title template according to the title template, the advertisement attribute key-value table and the query cluster in the following manner:

converting the title template into a matrix representation and a vector representation of the title template through the title encoder, converting the advertisement attribute key-value table into a matrix representation and a vector representation of the advertisement attribute key-value table through the key-value encoder, converting the query cluster into a matrix representation and a vector representation of the query cluster through the query encoder, and performing decoding and generating the rewriting title template through the decoder;

adding the vector representation of the title template, the vector representation of the advertisement attribute key-value table and the vector representation of the query cluster to generate an initial seed of a preset neural network decoder;

connecting the matrix representation of the title template, the matrix representation of the advertisement attribute key-value table and the matrix representation of the query cluster to create a memory; and generating, through the preset neural network decoder, the rewritten title template according to the initial seed and the memory.

8. The advertisement title rewriting device according to claim 7, wherein the processor is caused to replace the preset information in the advertisement title with the corresponding placeholder to convert the advertisement title into the title template in the following manners:
    in response to the advertisement title comprising at least one of a brand, a place, a target audience or a product, replacing the brand, the place, the target audience and the product with corresponding first placeholders respectively, wherein the first placeholders correspond to key-value pairs in the advertisement attribute key-value table; and
    in response to the advertisement title comprising information with a numeral, replacing the information with the numeral with a second placeholder, wherein the second placeholder is used for indicating that the preset neural network model does not perform decoding processing on the second placeholder.

9. The advertisement title rewriting device according to claim 8, wherein the processor is caused to replace the placeholder in the rewritten title template with the corresponding preset information to convert the rewritten title template into the rewritten title in the following manners:
    in response to the rewritten title template comprising the first placeholders, filling, according to a corresponding relationship between the first placeholders and the key-value pairs in the advertisement attribute key-value table, the rewritten title template through the key-value pairs in the advertisement attribute key-value table; and
    in response to the rewritten title template comprising the second placeholder, inserting the information with the numeral corresponding to the second placeholder into the rewritten title template.

10. The advertisement title rewriting device according to claim 7, wherein the processor is caused to convert the title template into the matrix representation and the vector representation of the title template through the title encoder in the following manner:
    generating a context word vector representation of the title template through the title encoder to form the matrix representation of the title template; and
    generating, using a maximum pooling layer and a linear layer on a sequence dimension, the vector representation of the title template according to the matrix representation of the title template;
    the processor is caused to convert the advertisement attribute key-value table into the matrix representation and the vector representation of the advertisement attribute key-value table through the key-value encoder in the following manner:
    encoding a single value of the advertisement attribute key-value table into a latent representation of the single value through the key-value encoder;
    generating, using the maximum pooling layer on the sequence dimension, a vector representation of the single value according to the latent representation of the single value;
    fusing the vector representation of the single value and a key corresponding to the single value into a fusion representation of the single value;
    encoding fusion representations of all values in the advertisement attribute key-value table into a context key-value vector representation of the advertisement attribute key-value table through a no-position transformer to form the matrix representation of the advertisement attribute key-value table; and
    generating, using the maximum pooling layer on the sequence dimension, the vector representation of the advertisement attribute key-value table according to the context key-value vector representation of the advertisement attribute key-value table; and
    the processor is caused to convert the query cluster into the matrix representation and the vector representation of the query cluster through the query encoder in the following manner:
    generating a context word vector representation of the query cluster through the query encoder to form the matrix representation of the query cluster; and
    generating, using the maximum pooling layer and the linear layer on the sequence dimension, the vector representation of the query cluster according to the matrix representation of the query cluster.

11. The advertisement title rewriting device according to claim 10, wherein the preset neural network decoder is a long-short term memory (LSTM) decoder; and the processor is caused to generate, through the preset neural network decoder, the rewritten title template according to the initial seed and the memory in the following manner:
    accessing the memory through the LSTM decoder via multi-hop attention and multi-head attention, and autoregressively generating the rewritten title template according to the initial seed and the memory.

12. The advertisement title rewriting device according to claim 7, before generating, through the preset neural network model, the rewritten title template according to the title template, the advertisement attribute key-value table and the query cluster, the processor is further caused to:
    acquire a query in an online search;
    retrieve an advertisement matching the query and an advertisement attribute table corresponding to the advertisement from an advertisement database according to the query;
    construct a pair of a low click-through rate title and a high click-through rate title according to the query and the advertisement matching the query, wherein the high click-through rate title is obtained by the preset neural network model rewriting the low click-through rate title;
    construct an array of the low click-through rate title, the advertisement attribute table, the query and the high click-through rate title as rewriting data;
    divide the rewriting data into a data set with the query and a data set without the query according to whether an online advertisement comprises the query;
    train the preset neural network model by using the data set without the query to obtain a title encoder, a table encoder and a title decoder;
    create a query encoder, and insert the query encoder into a codec architecture; and
    train the preset neural network model by using the data set with the query to acquire a trained query encoder, and teach the title decoder to use query information to obtain the preset neural network model through training.

13. A non-transitory storage medium comprising computer-executable instructions which, when executed by a computer processor, cause the computer processor to:
    replace preset information in an advertisement title with a corresponding placeholder to convert the advertisement title into a title template;
    generate, through a preset neural network model, a rewritten title template according to the title template, an advertisement attribute key-value table and a query cluster; and replace the placeholder in the rewritten title template with the corresponding preset information to convert the rewritten title template into a rewritten title;

wherein the preset neural network model is composed of a title encoder, a key-value encoder, a query encoder and a decoder;

wherein the computer-executable instructions cause the computer processor to generate, through the preset neural network model, the rewritten title template according to the title template, the advertisement attribute key-value table and the query cluster in the following manner:

converting the title template into a matrix representation and a vector representation of the title template through the title encoder, converting the advertisement attribute key-value table into a matrix representation and a vector representation of the advertisement attribute key-value table through the key-value encoder, converting the query cluster into a matrix representation and a vector representation of the query cluster through the query encoder, and performing decoding and generating the rewriting title template through the decoder;

adding the vector representation of the title template, the vector representation of the advertisement attribute key-value table and the vector representation of the query cluster to generate an initial seed of a preset neural network decoder;

connecting the matrix representation of the title template, the matrix representation of the advertisement attribute key-value table and the matrix representation of the query cluster to create a memory; and generating, through the preset neural network decoder, the rewritten title template according to the initial seed and the memory.

14. The non-transitory storage medium according to claim 13, wherein the computer processor is caused to replace the preset information in the advertisement title with the corresponding placeholder to convert the advertisement title into the title template in the following manners:

in response to the advertisement title comprising at least one of a brand, a place, a target audience or a product, replacing the brand, the place, the target audience and the product with corresponding first placeholders respectively, wherein the first placeholders correspond to key-value pairs in the advertisement attribute key-value table; and in response to the advertisement title comprising information with a numeral, replacing the information with the numeral with a second placeholder, wherein the second placeholder is used for indicating that the preset neural network model does not perform decoding processing on the second placeholder.

15. The non-transitory storage medium according to claim 14, wherein the computer processor is caused to replace the placeholder in the rewritten title template with the corresponding preset information to convert the rewritten title template into the rewritten title in the following manners:

in response to the rewritten title template comprising the first placeholders, filling, according to a corresponding relationship between the first placeholders and the key-value pairs in the advertisement attribute key-value table, the rewritten title template through the key-value pairs in the advertisement attribute key-value table; and in response to the rewritten title template comprising the second placeholder, inserting the information with the numeral corresponding to the second placeholder into the rewritten title template.

16. The non-transitory storage medium according to claim 13, wherein the computer processor is caused to convert the title template into the matrix representation and the vector representation of the title template through the title encoder in the following manner:

generating a context word vector representation of the title template through the title encoder to form the matrix representation of the title template; and generating, using a maximum pooling layer and a linear layer on a sequence dimension, the vector representation of the title template according to the matrix representation of the title template;

the computer processor is caused to convert the advertisement attribute key-value table into the matrix representation and the vector representation of the advertisement attribute key-value table through the key-value encoder in the following manner:

encoding a single value of the advertisement attribute key-value table into a latent representation of the single value through the key-value encoder;

generating, using the maximum pooling layer on the sequence dimension, a vector representation of the single value according to the latent representation of the single value;

fusing the vector representation of the single value and a key corresponding to the single value into a fusion representation of the single value;

encoding fusion representations of all values in the advertisement attribute key-value table into a context key-value vector representation of the advertisement attribute key-value table through a no-position transformer to form the matrix representation of the advertisement attribute key-value table; and generating, using the maximum pooling layer on the sequence dimension, the vector representation of the advertisement attribute key-value table according to the context key-value vector representation of the advertisement attribute key-value table; and the computer processor is caused to convert the query cluster into the matrix representation and the vector representation of the query cluster through the query encoder in the following manner:

generating a context word vector representation of the query cluster through the query encoder to form the matrix representation of the query cluster; and generating, using the maximum pooling layer and the linear layer on the sequence dimension, the vector representation of the query cluster according to the matrix representation of the query cluster.

17. The non-transitory storage medium according to claim 16, wherein the preset neural network decoder is a long-short term memory (LSTM) decoder; and the computer processor is caused to generate, through the preset neural network decoder, the rewritten title template according to the initial seed and the memory in the following manner:

accessing the memory through the LSTM decoder via multi-hop attention and multi-head attention, and autoregressively generating the rewritten title template according to the initial seed and the memory.

18. The non-transitory storage medium according to claim 13, before generating, through the preset neural network model, the rewritten title template according to the title template, the advertisement attribute key-value table and the query cluster, the computer processor is further caused to:

acquire a query in an online search;

retrieve an advertisement matching the query and an advertisement attribute table corresponding to the advertisement from an advertisement database according to the query;

construct a pair of a low click-through rate title and a high click-through rate title according to the query and the advertisement matching the query, wherein the high click-through rate title is obtained by the preset neural network model rewriting the low click-through rate title;

construct an array of the low click-through rate title, the advertisement attribute table, the query and the high click-through rate title as rewriting data;

divide the rewriting data into a data set with the query and a data set without the query according to whether an online advertisement comprises the query;

train the preset neural network model by using the data set without the query to obtain a title encoder, a table encoder and a title decoder;

create a query encoder, and insert the query encoder into a codec architecture; and train the preset neural network model by using the data set with the query to acquire a trained query encoder, and teach the title decoder to use query information to obtain the preset neural network model through training.

* * * * *